Dec. 18, 1951 J. G. OETZEL 2,578,716
MAGNETICALLY CONTROLLED FRICTION CLUTCH
Filed Oct. 29, 1948 3 Sheets-Sheet 1
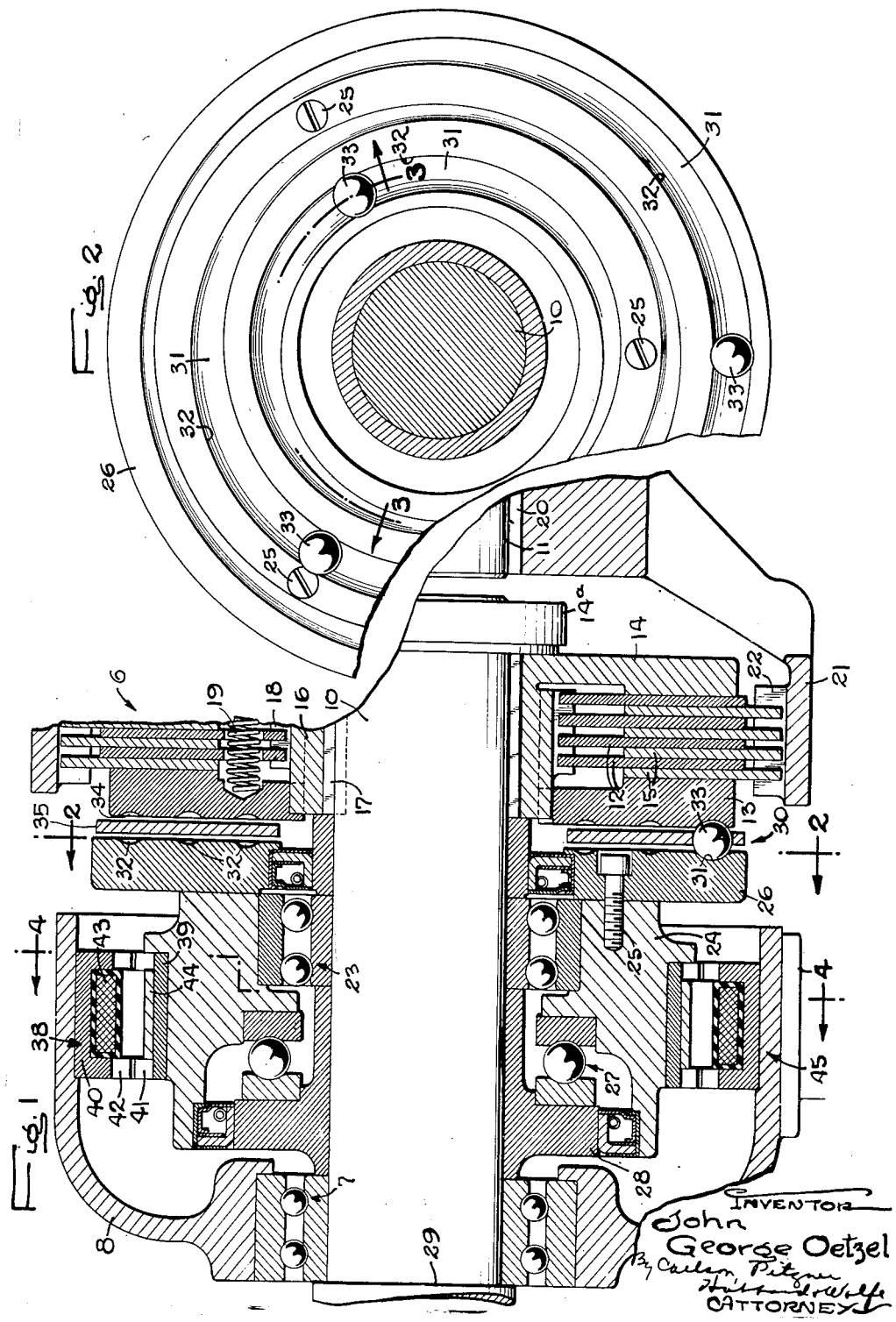
INVENTOR
John George Oetzel
ATTORNEY Dec. 18, 1951 J. G. OETZEL 2,578,716
MAGNETICALLY CONTROLLED FRICTION CLUTCH
Filed Oct. 29, 1948 3 Sheets-Sheet 2
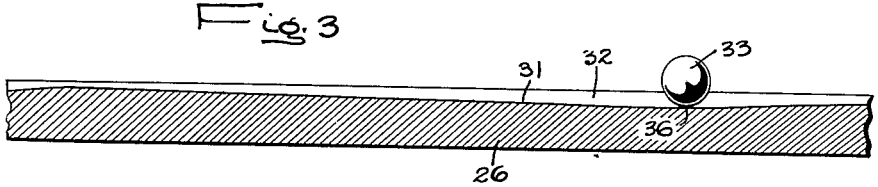
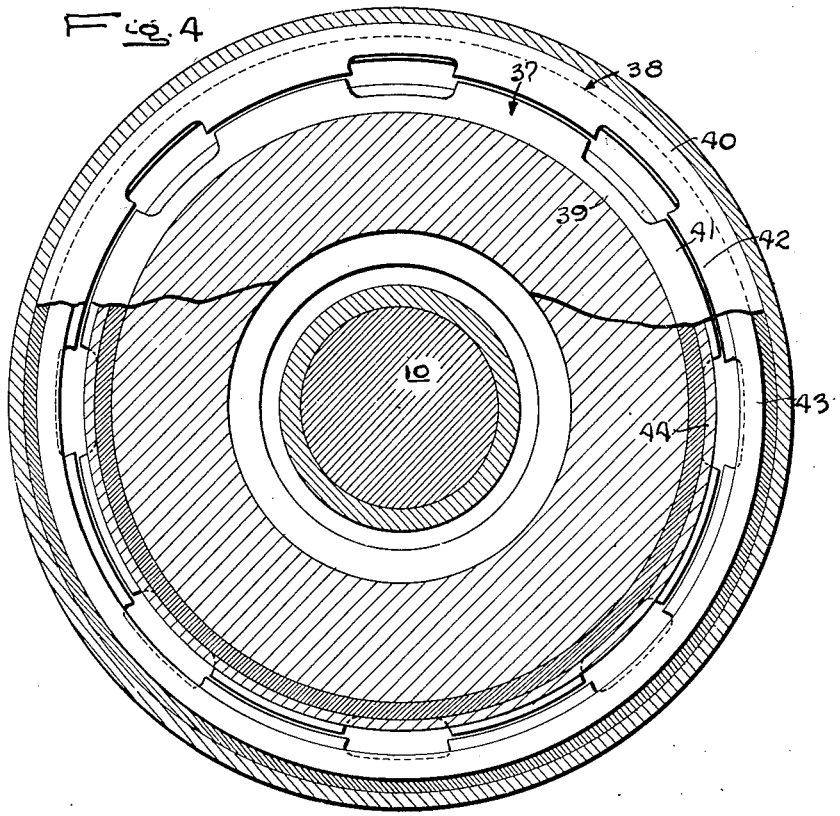
INVENTOR
John George Oetzel Dec. 18, 1951   J. G. OETZEL   2,578,716
MAGNETICALLY CONTROLLED FRICTION CLUTCH
Filed Oct. 29, 1948   3 Sheets-Sheet 3
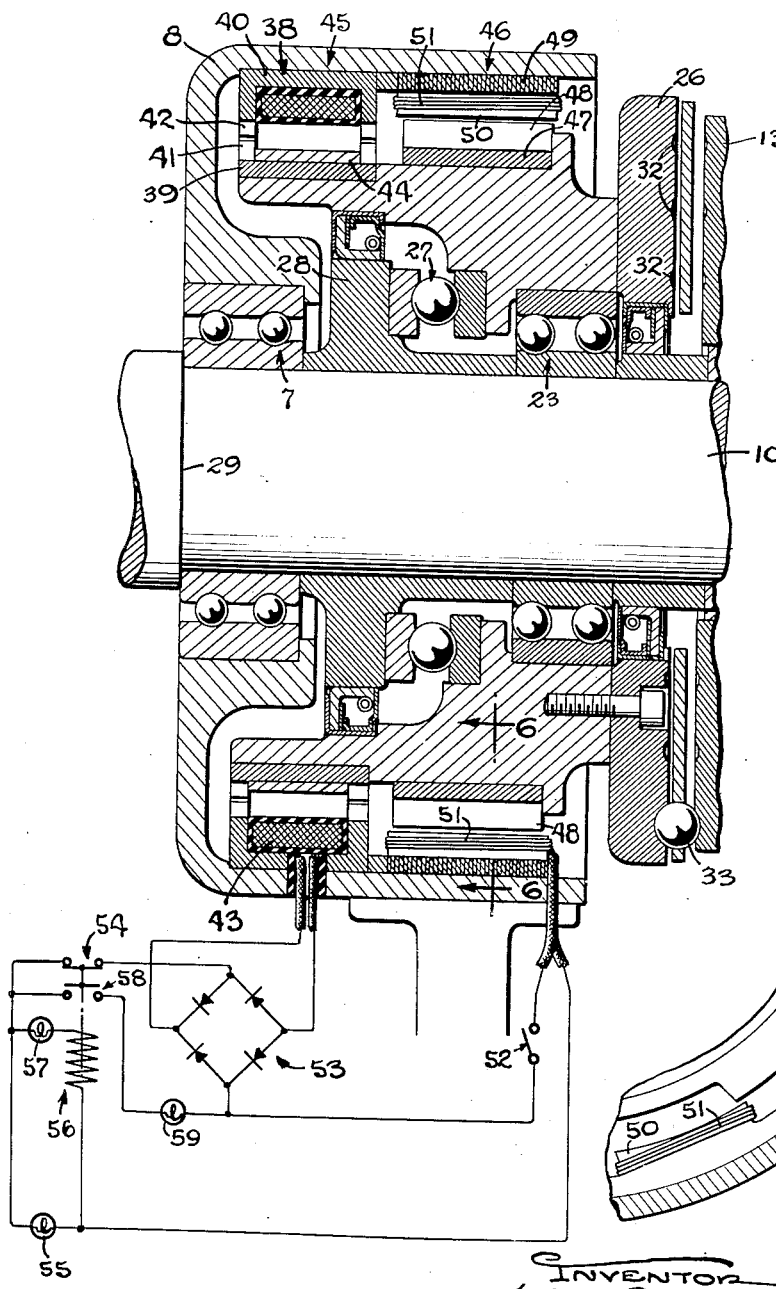
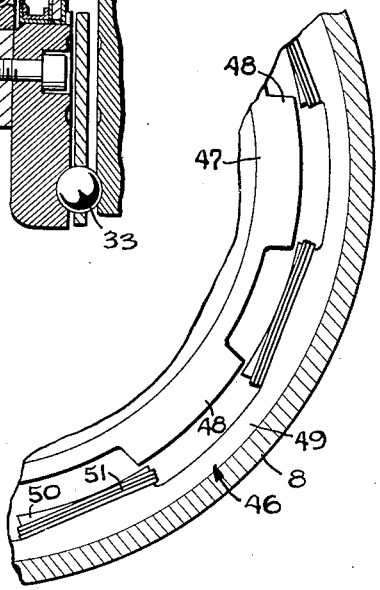
INVENTOR
John George Oetzel
By Carlen, Pitzner Hussard Wolf
ATTORNEY Patented Dec. 18, 1951

2,578,716

UNITED STATES PATENT OFFICE 2,578,716

MAGNETICALLY CONTROLLED FRICTION CLUTCH

John George Oetzel, Beloit, Wis., assignor to Warner Electric Brake & Clutch Company, a corporation of Illinois Application October 29, 1948, Serial No. 57,326

4 Claims. (Cl. 192—40)

This invention relates to friction clutches and more particularly to those of the type in which the force for engaging the clutch is derived from the rotation of the driving clutch element by exerting a frictionless magnetic drag on a part which normally rotates with said driving element but is rotatable relative to the latter to cause the clutch engaging action.

One object is to provide a clutch actuator of the above character in which the magnetic drag is produced in a novel manner.

A further object is to produce the magnetic drag by means of an electric generator having a nonrotatable stator with selectively energizable windings thereon and a short circuited rotor adapted to dissipate the generated heat without danger of deterioration in service use.

Another object is to energize the clutch by the combined action of two electromagnetic drag producing devices, one of which generates current for energizing the other.

A more detailed object is to produce one part of the controllable magnetic drag by an electric generator having a permanent magnet field and to utilize the generator current to energize a secondary magnetic device to exert an additional magnetic drag for actuating the main clutch.

Other objects and advantages of the invention will become apparent from the following detailed description taken in connection with the accompanying drawings, in which Figure 1 is a fragmentary longitudinal diametrical cross section of a clutch embodying the novel features of the present invention.

Fig. 2 is a cross section taken along the line 2—2 of Fig. 1.

Fig. 3 is a fragmentary section taken along the arc 3—3 of Fig. 2.

Fig. 4 is a cross section taken along the line 4—4 of Fig. 1.

Fig. 5 is a view similar to Fig. 1 showing a modification.

Fig. 6 is a fragmentary view taken along the line 6—6 of Fig. 5.

While the invention is susceptible of various modifications and alternative constructions, I have shown in the drawings and will herein describe in detail the preferred embodiment. It is to be understood, however, that I do not intend to limit the invention by such disclosure but aim to cover all modifications and alternative constructions falling within the spirit and scope of the invention as expressed in the appended claims.

The invention is shown on the drawings embodied in a so-called multiple disk friction clutch or coupling 6 for transmitting rotary power from a driving shaft 10 to a driven shaft 11. Herein the shafts are alined with each other and journaled in suitable bearings including an antifriction bearing 7 in the hub of a stationary housing 8.

The clutch 6 is engaged by pressing into axial engagement a plurality of plates or disks 12, 13, 14 and 15 arranged coaxially and composed of suitable friction material. Herein, the disk 14 is formed with a hub 16 splined at 17 onto the driving shaft 10 and loosely spline connected at 18 to the disks 12 and 13, the disks 13 and 14 being urged apart by a plurality of annularly spaced compression springs 19. A nut 14ª screwed onto the shaft 10 forms a rigid backing for the terminal disk 14. The driven shaft 11 is keyed at 20 to the hub of a casing 21 into which the disks 15 are loosely splined as indicated at 22.

Journaled on bearings 23 on the driving shaft 10 is the hub 24 of an actuating disk 26 connected to the hub by screws 25 and disposed adjacent to but axially spaced from the terminal clutch disk 12. A thrust bearing 27 is interposed between the hub 24 and a flange 28 on a sleeve carried by the shaft 10 and backed by a shoulder 29 acting through the inner race of the bearing 7. An antifriction backing is thus formed for the actuating disk 26 which may rotate with the driving shaft 10 but is adapted to turn relative thereto in either direction away from a normal clutch-released position.

Angular motion of the disk 26 relative to the driving shaft 10 is converted into axial movement of the terminal clutch plate 13 to compress the driving and driven clutch plates together to engage the clutch 6. To obtain a substantial mechanical advantage and minimize friction, the motion is transmitted through a force augmenting connection 30 including elongated circumferentially sloping cam surfaces 31 constituting the bottoms of a plurality of grooves 32 formed in the face of the disk 26 and coacting with balls 33 that roll in grooves 34 in the opposed face of the terminal clutch disk 13. Preferably, the balls are held angularly spaced by a cage 35 and the grooves 32 and 34 are concentric with each other and the clutch axis. The cam surfaces 31, which may thus extend substantially throughout a full revolution in the case of a unidirectional clutch, rise gradually and circumferentially from low points 36 in which the respective balls are seated when the disk 26 is turned relative to the driving shaft to a normal clutch-released position.

Whenever the actuating disk 26 is free, it is maintained in this clutch-released position by the action of the springs 19 acting backwardly through the antifriction cam connection.

Electrically energized and selectively controlled means indicated generally at 45 are provided for exerting a magnetic drag or torque on the actuating disk 26 to hold the latter back and thus cause relative turning between the disk and the driving shaft 10 and actuation of the cam mechanism to engage the clutch 6. In the form shown in Fig. 1, this means comprises a stationarily mounted wound stator 38 adapted to be energized by direct current to produce a magnetic field which threads a rotor 37 in which electric currents are generated to produce the magnetic drag for retarding the clutch actuating member 26.

In the present instance, both the rotor and stator are composed of magnetic material such as iron and comprise rings 39 and 40 of U-shaped cross section with the radially projecting legs interrupted at circumferentially spaced points to form outwardly projecting rotor poles 41 and inwardly projecting stator poles 42, the end faces of which are of substantially equal arcuate lengths and closely spaced so as to register with each other when the parts are angularly disposed as shown in Fig. 4. A multiple turn winding 43 is secured within the stator ring between the poles 42 and a single turn winding 44 comprising a heavy ring of copper or the like which encircles the rotor ring between the poles 41. The stator ring 40 is pressed into the stationary casing 8 which is made of non-magnetic material. In a similar way, the rotor ring is secured to the non-magnetic hub 24 so as to turn with the clutch actuating disk 26.

The winding 43 is adapted to be energized by direct current from a suitable external source by controlling the opening and closing of a circuit through the winding, the degree of such energization being governed in any preferred manner. Upon such energization, magnetic flux threads the stator and rotor cores around the windings 43 and 44 and the rotor tends to assume a position relative to the stator of minimum reluctance of the magnetic circuits through the poles, the faces of which are then alined as shown in Fig. 4. As a result of this tendency, a drag proportional to the energization of the stator is exerted on the rotor.

Under this drag, the disk 26 is held back and the clutch disk 13 turns ahead resulting in relative angular motion between the two disks causing the balls 33 to roll up the cam inclines 31 separating the disks 13 and 26 and forcing the disk 12 axially to compress the clutch plates into frictional gripping engagement with a force determined by the magnetic drag torque multiplied by the mechanical advantage of the cam mechanism. The shafts 10 and 11 are thus coupled frictionally to transmit a corresponding amount of power.

When the drag device 45 is again disabled by interrupting the circuit through the winding 43, the disk 26 is freed and the springs 19, acting backwardly through the ball cam mechanism, turn the disk reversely to released position. The clutch is thus released and the shafts 10 and 11 are uncoupled.

The provision of the short circuited coil 44 on the rotor 37 greatly augments the magnetic drag resulting from a given energization of the stator. This is due to the currents induced in the coil which produce a magnetic field augmenting the field produced by energization of the winding 43. Thus, the device 45 acts as a short circuited electric generator, the rotor winding of which is adapted to withstand substantial heating without danger of deterioration.

In the modification shown in Figs. 5 and 6, the current for energizing a magnetic drag-producing means such as the device 45 is derived from rotation of the driving element itself by an auxiliary device which also imposes an additional drag. The auxiliary device is an electric generator 46 preferably having a field member or rotor 47 which turns with the actuating disk 26 and is permanently magnetized to avoid the necessity of using slip rings. For this purpose, the rotor may comprise a ring of magnetizable material such as so-called Alnico pressed onto the hub 24 and having angularly spaced and outwardly projecting pole pieces 48.

The generator stator 49 comprises a laminated magnetic ring having inwardly projecting pole pieces 50 and pressed into the casing 8 adjacent the drag device 45. Series connected windings 51 are oppositely wound around the adjacent pole pieces 50.

When the circuit through the windings is open, the generator remains ineffectual and the rotor turns in unison with the driving shaft, the actuating disk 26 remains in clutch-released position where it is held by the springs 19 acting back through the cam mechanism. Now when the circuit is closed, the generator is rendered active to produce a magnetic drag on the rotor proportional to the magnitude of the alternating current permitted to flow in the windings 51. This current is fed into and utilized to energize the short-circuited armature brake 45 above described. To this end, one terminal of the winding 51 is connected through a control switch 52 to a rectifier 53 whose output terminals are connected to the winding 43 of the magnetic brake 45. The other generator terminal is connected to the rectifier, in this instance through a normally closed switch 54 and a resistance element 55 such, for example, as an incandescent lamp bulb. Thus, whenever the switch 52 is closed, the generator 46 will be rendered operative not only to produce a primary magnetic drag on the actuating disk 26 of the clutch 6 but also to generate current for energizing the magnetic brake 45 and thereby produce a drag supplementing that of the generator. As a result, the total drag on the disk 26 is of substantial magnitude even though the driving shaft 10 may be turning at relatively low speed.

For some applications, the magnetic brake 45 is mainly useful to effect the initial engagement of the clutch 6 after which it may be disabled and the engagement of the clutch continued under the action of the drag produced by the generator 46 alone. Such disabling of the device 45 may be effected by a relay 56 which becomes energized effectually after a short delay following the initial closure of the generator circuit. Herein, the relay is energized by the voltage drop across the load resistance 55 and a second similar resistance 57 and, in view of the high value of these resistances when they are cold, remains deenergized until the lamp filaments have become heated. Thus, the switch 54 of the relay remains closed and a switch 58 is held open for a short interval thereby maintaining the generator 46 connected through the rectifier to the brake 45.

When, after heating of the lamp filaments, the relay current has increased sufficiently to move the relay armature, the switch 54 is opened and the switch 58 is closed. This disconnects the rectifier and the brake winding 43 from the generator whose armature circuit remains closed through the lamp 55 and a second lamp 59. Thereafter, the clutch 6 is maintained engaged under a force proportional to the drag produced by the generator 46 alone.

It will be apparent from the foregoing that the improved clutch actuator is readily adaptable to various conditions occurring in service including varying speeds of the driving shaft. The drag by which the clutching action is produced is derived magnetically and without friction between the parts. As a result, the clutch is readily controllable even by delicate instrumentalities and remains constant in its action in spite of varying conditions occurring in service use.

I claim as my invention:

1. The combination of, driving and driven shafts, a friction clutch coupling said shafts, a member mounted on said driving shaft for angular displacement relative thereto about the shaft axis, said member being normally rotatable with said driving shaft, an actuating connection between said member and said clutch operable upon turning of the member relative to said driving shaft away from and back to a clutch released position to effect engagement and to permit disengagement of the clutch, an electric generator having a nonrotatable stator and an armature rotatable with said member, a magnetic brake operable when energized to retard the rotation of said member and having a nonrotatable element adapted to be energized by said generator and a rotor rotatable with said member, means by which said generator may be activated to impose a magnetic drag on said member and energize said brake, and means automatically operable after a time interval to disable said brake while maintaining said generator effectual in continuing the drag on said member.

2. The combination of, driving and driven shafts, a clutch having frictionally engageable elements respectively rotatable with said shafts, a member normally rotatable with said driving shaft and mounted for rotation relative thereto, means actuated in response to rotation of said member relative to said driving shaft to apply and release said clutch, permanently magnetized poles on said member, a stationarily mounted wound stator coacting with said poles to form a generator operable to produce a magnetic drag on the member, a magnetic inductor rotatable with said member and driving shaft, and a nonrotatable magnet energized by the current delivered by said generator and coacting with said inductor to impose a magnetic drag thereon supplementing the drag produced by said generator.

3. The combination of, driving and driven shafts, a clutch having frictionally engageable elements respectively rotatable with said shafts, a member normally rotatable with said driving shaft and mounted for rotation relative thereto, means operable by movement of said member away from a normal clutch released position to apply said clutch, a magnetic brake adapted when energized to exert a retarding force on said member, said brake having coacting relatively rotatable elements with surfaces spaced apart, and an electric generator for energizing said brake having a rotor rotatable with said member and a nonrotatable stator.

4. The combination of, driving and driven shafts, a friction clutch coupling said shafts, a member normally rotatable with said driving shaft and mounted thereon for angular displacement relative thereto about the shaft axis, means actuated in response to angular displacement of said member relative to said shaft to engage said clutch, and a magnetic brake adapted when energized to exert force retarding the rotation of said member, said brake comprising a stationarily mounted wound stator and a coacting magnetic armature rotatable with said member having a single turn short-circuited coil thereon enclosing a magnetic circuit through said stator and armature.

JOHN GEORGE OETZEL.

REFERENCES CITED

The following references are of record in the file of this patent:

UNITED STATES PATENTS

| Number | Name | Date |
|---|---|---|
| 1,974,390 | Eason | Sept. 18, 1934 |
| 2,061,787 | Warner | Nov. 24, 1936 |
| 2,091,270 | Colman | Aug. 31, 1937 |
| 2,374,688 | La Brie | May 1, 1945 |